United States Patent
Rhine et al.

(10) Patent No.: US 7,310,343 B2
(45) Date of Patent: Dec. 18, 2007

(54) SYSTEMS AND METHODS FOR RAPID SELECTION OF DEVICES IN A TREE TOPOLOGY NETWORK

(75) Inventors: Scott Alan Rhine, Frisco, TX (US); Sharad Singhal, Belmont, CA (US); Xiaoyun Zhu, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 948 days.

(21) Appl. No.: 10/327,356

(22) Filed: Dec. 20, 2002

(65) Prior Publication Data
US 2004/0120331 A1  Jun. 24, 2004

(51) Int. Cl.
  *H04L 12/44* (2006.01)
(52) U.S. Cl. ...................... 370/408; 370/256
(58) Field of Classification Search ......... 370/254–256
  See application file for complete search history.

(56) References Cited

U.S. PATENT DOCUMENTS

| | | | |
|---|---|---|---|
| 6,519,610 B1 * | 2/2003 | Ireland et al. | 707/104.1 |
| 7,047,510 B1 * | 5/2006 | Chopra et al. | 716/7 |
| 2003/0104829 A1 | 6/2003 | Alzoubi et al. | |
| 2003/0204537 A1 | 10/2003 | Liang et al. | |
| 2005/0091443 A1 * | 4/2005 | Hershkovich et al. | 711/100 |

FOREIGN PATENT DOCUMENTS

| | | |
|---|---|---|
| WO | WO9118462 | 11/1991 |
| WO | WO0165764 | 9/2001 |

\* cited by examiner

*Primary Examiner*—Chi Pham
*Assistant Examiner*—Thai Hoang

(57) ABSTRACT

Methods and apparatus for creating a network farm from a tree topology network are disclosed. One method includes receiving a logical specification of the farm, the logical specification specifying at least one of device types required by the farm and a number of devices for each of the device types. The method further includes receiving a communication model for the farm, the communication model specifying expected bandwidth usage for devices of the farm. The method additionally includes ascertaining, responsive to the logical specification and the communication model, a solution set of devices among devices of the tree topology network for constructing the farm. The ascertaining includes performing partitioned greedy recursion on switching elements of the tree topology network, which includes recursively ascertaining, starting from the top level of the tree topology network and recursing toward the lowest switching element level of the tree topology network, the lowest cost solution at each switching element level of the tree topology network, wherein the lowest cost solution that completely satisfies resource requirements of the farm and that is found after the tree topology network is traversed by the partitioned greedy recursion is deemed the solution set of devices.

25 Claims, 11 Drawing Sheets

For a given node, list all children that still has devices needed by farm (372)
    LOOP: for each child of this node that is not already in the solution set (374)
        Take as much of each resource as possible until demand is met (376)
        If there are multiple clusters of the same device type, take the one with
            the lowest communication cost first (378)
        Determine choice cost (380)
        Solve this child node recursively (382)
        If the cost is still under the current upper bound, insert permutation
            into sorted list (384)
    If there are no children left, return failure (386)
    Get the best solution to date (388)
    If no demand left, return solution (390)
    Goto LOOP (392)

Fig. 3C

SYSTEMS AND METHODS FOR RAPID SELECTION OF DEVICES IN A TREE TOPOLOGY NETWORK

BACKGROUND OF THE INVENTION

Computer networks are pervasive these days. In a typical computer network, various devices of different types are interconnected via switching elements, such as routers, switches and hubs, to allow the devices to communicate among one another according to a predefined communication model.

There are various ways in which networks can be configured into topologies required by applications on those networks. The simplest network tends to involve hardwiring the various devices together using appropriate switching elements and interconnecting media (e.g., conductive cables, fiber optic cables, the wireless medium, etc.). Although the hardwire approach works well for relatively small, static network configurations, it does not scale well and tends to result in networks that are difficult to manage and upgrade.

Recently, there has been proposed a more flexible approach to building computer networks. Instead of constructing each network topology piecemeal by hardwiring the devices together, the devices are viewed as belonging to a common pool of resources, which are disposed in a hierarchical tree topology. A hierarchical tree topology is selected since devices in the tree communicate among themselves along deterministic communication paths, thereby simplifying the provisioning and upgrade tasks. Within the hierarchical tree topology, the devices are interconnected using a pool of switching elements. Depending on how the switching elements are configured, various logical networks can be constructed from this common pool of devices and switching elements (e.g., switches, routers, and hubs) using, for example, a virtual local area network (VLAN) technology. A discussion of one exemplary VLAN technology may be obtained from the IEEE 802.1Q working group (http://grouper.ieee.org/groups/802/1/,September 2002)

Under this approach, any number of logical network topologies can be constructed simultaneously from the physical network if there are sufficient resources in the common pool of devices and switching elements (e.g., switches, routers, and hubs) of the tree. For example, an organization wishes to create or upgrade to a three-tier application topology having two database servers, five application servers, four web servers, and a firewall for Internet access. From this specification and the communication model, which governs the communication policy (including the expected bandwidth usage) for each device required for the application, the necessary devices (e.g., database servers, application servers, web servers and firewalls) may be picked from the common pool of devices and interconnected using the switching elements in the tree. Thus, the construction of a logical network topology becomes an exercise in picking the required devices from the pool of available devices existing in the tree hierarchy and to configure the switching elements appropriately to interconnect the devices as specified by the communication model and the logical specification. Such a network (containing a variety of devices and network elements so that they comply with a given communication model) is herein referred to as a "farm."

To facilitate discussion, FIG. 1 illustrates an exemplary data center 100, representing the common pool of networked devices and switching elements from which various farms can be constructed. Data center 100 includes a hub 1101 (containing 8 network ports for a total of 4096 Mbps bandwidth) at the root level of the hierarchical tree. Hub 1101 is coupled with two routers 2000 and 2001, both of which are 8-port, 4096 Mbps routers disposed at level 1 of the tree. Router 2000 is coupled with three switches (8002, 8001, and 8003) and three load balancers (20001, 20002, and 20003), all of which are disposed at level 2 of the tree. Router 2001 is coupled with three switches (9002, 9001, and 9003) and two load balancers (20004 and 20005), all of which are disposed at level 2 of the tree.

Switch 8002, which is a 12-port, 1024 Mbps switch, is coupled to two network attached storage (NAS) devices 24002 and 24003, each of which is a 2-port, 80 Mbps NAS and is disposed at level 3 of the tree. Switch 8002 is also coupled to four LP2000R application servers (numbered 11001, 11002, 11003, and 11004, which are 1-port, 100 Mbps each in the example of FIG. 1), all of which are disposed at level 3 of the tree. Switch 8001, which is a 9-port, 1024 Mbps switch, is coupled to two firewalls 18002 and 19002, each of which is a 2-port, 100 Mbps firewall, as well as four database servers A500 (numbered 12001, 12002, 12003, and 12004, each of which is a 1-port, 100 Mbps server in the example of FIG. 1). Switch 8003, which is a 6-port, 1024 Mbps switch, is coupled to four N4000 application servers (numbered 31001, 31002, 31003, and 31004, each of which is a 1-port, 100 Mbps server).

Switch 9001, which is an 8-port, 1024 Mbps switch, is coupled to a firewall 18003 (2-port, 100 Mbps) as well as four LP2000R (1-port, 100 Mbps) application servers 11005, 11006, 11007, and 11008, all of which are disposed at level 3 of the tree. Switch 9002, which is an 8-port, 1024 Mbps switch, is coupled to a firewall 18004 (2-port, 100 Mbps) and five LP2000R (1-port, 100 Mbps) application servers 11010, 11011, 11012, 11013, and 11014, all of which are disposed at level 3 of the tree. Switch 9003, which is a 11-port, 1024 Mbps switch, is coupled to two firewalls 18005 and 18006 (2-port, 100 Mbps each) and two LP2000R (1-port, 100 Mbps) application servers 11014 and 11015. Switch 9003 is also coupled with four database servers A500 (1-port, 100 Mbps each and numbered 12005, 12006, 12007, and 12008 in the example of FIG. 1), all of which are disposed at level 3 of the tree.

Suppose one wishes to build a farm, which specifies a three-tier architecture having two A500 database servers, five LP2000R application servers, and a firewall for Internet access, from the physical network specified in the data center 100 of FIG. 1. Furthermore, the LP2000R application servers do not communicate among one another, nor do the A500 database servers communicate between themselves. The logical specification of this farm is shown in FIG. 2. Assuming all the devices in data center 100 are available for use, there are more than sufficient resources in data center 100 to construct the farm.

If efficiency is not a concern, the farm may be constructed by randomly picking the devices (e.g., the database servers, the LP2000R application servers, and the firewall) from the available devices in the data center 100, and appropriately configuring the switching elements that are disposed along their possible communication paths to construct the required farm. However, such a random approach does not optimize the bandwidth usage in data center 100 and may require data to traverse more hops than necessary. Consider the communication between the firewall and an LP2000R application server, for example. If firewall 18002 and LP2000R application server 11001 are picked, the communication between firewall 18002 and LP2000R application server 11001 requires only four hops (via switch 8001, router 2000, and switch 8002). On the other hand, if firewall 18002 and LP2000R application server 11005 are picked, the communication between firewall 18002 and LP2000R application server 11005 requires a total of six hops (via switch 8001, router 2000, hub 1101, router 2001, and switch 9001). In addition, traffic congestion can become a problem at the switches. For example, if all devices connected to router 2000 send all their traffic (4632 Mbps) though it, router 2000 will become congested because it only has 4096 Mbps available, and traffic will be dropped at the router. The random approach does not take bandwidth efficiency and network congestion into consideration when picking the constituent devices.

Another approach known as first-come-first-served (FCFS) dictates that one may traverse the tree in a given direction and gather as many resources along the way as possible until all resource requirements are satisfied. Under this approach, the aforementioned farm may be constructed, for example, using resources encountered when traversing through router 2000, its child nodes and its grandchild nodes, and then through router 2001, its child nodes and its grandchild nodes, stopping along the way if and when the required resources are all obtained. In this example, the first firewall encountered is firewall 18002, the first two database servers encountered are A500 database servers 12001 and 12002, and the five LP2000R application servers encountered are LP2000R servers 11001, 11002, 11003, 11004, and 10005. Like the random approach, there is little intelligence in the selection of the constituent devices needed for the farm with respect to bandwidth efficiency. Accordingly, farms constructed using the first-come-first-served paradigm for device selection may also result in bandwidth inefficiency and performance degradation. Another extreme is an exhaustive algorithm, which explores every possible permutation of devices in order to pick the optimum set. Unfortunately, this can take an unacceptable amount of time, and the algorithm becomes infeasible for even moderate sized problems.

In view of the foregoing, there are desired improved methods and apparatus for selecting constituent devices needed for a farm from the pool of available devices in a tree hierarchy so that the resultant farm would employ bandwidth more efficiently than achievable using the other approaches.

SUMMARY OF THE INVENTION

The invention relates, in one embodiment, to a method for creating a network farm from a tree topology network. The method includes receiving a logical specification of the farm, with the logical specification specifying at least one of device types required by the farm and a number of devices for each of the device types. The method further includes receiving a communication model for the farm, with the communication model specifying expected bandwidth usage for devices of the farm. The method additionally includes ascertaining, responsive to the logical specification and the communication model, a solution set of devices among devices of the tree topology network for constructing the farm. The ascertaining includes performing partitioned greedy recursion on switching elements of the tree topology network, which includes recursively ascertaining, starting from the top level of the tree topology network and recursing toward the lowest switching element level of the tree topology network, the lowest cost solution at each switching element level of the tree topology network, wherein the lowest cost solution that completely satisfies resource requirements of the farm and that is found after the tree topology network is traversed by the partitioned greedy recursion is deemed the solution set of devices.

In another embodiment, the invention relates to a computer-implemented method for ascertaining, responsive to a logical specification of a network farm and a communication model for the farm, a solution set of devices among devices of a tree topology network for constructing the farm. The method includes performing switch simplification on the tree topology network, which includes ascertaining a number of each device type from each rack switch. Each rack switch represents a switch at the lowest switching element level of the tree topology network. The computer-implemented method also includes performing partitioned greedy recursion on switching elements of the tree topology network, which includes recursively ascertaining, starting from the top level of the tree topology network, the lowest cost solution at each switching element level of the tree topology network.

In yet another embodiment, the invention relates to an article of manufacture comprising a program storage medium having computer readable code embodied therein, the computer readable code being configured for ascertaining, responsive to a logical specification of a network farm and a communication model for the farm, a solution set of devices among devices of a tree topology network for constructing the farm. The aforementioned computer readable codes includes computer readable codes for performing switch simplification on the tree topology network, the switch simplification includes ascertaining a number of each device type from each rack switch. Each rack switch represents a switch at the lowest switching element level of the tree topology network. There are included computer readable codes for performing partitioned greedy recursion on switching elements of the tree topology network. The computer readable codes for partitioned greedy recursion includes computer readable codes for recursively ascertaining, starting from the top level of the tree topology network, the lowest cost solution at each switching element level of the tree topology network.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3C illustrates, in accordance with one embodiment of the present invention, a partitioned greedy recursion algorithm (PGRA).

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one embodiment, there is provided a technique for efficiently selecting devices needed for a farm from a pool of available devices networked in a tree hierarchy. Using the logical specification and communication model of the farm, a greedy device selection technique (GDST) is employed to select the required devices. With the greedy device selection technique (GDST), the solution obtained may be substantially more efficient than that obtained by random selection of required devices or by picking devices using a first-come-first-served methodology.

Efficiency is measured in part by the cost of the solution (bytes transmitted times the number of hops) and switch congestion. Furthermore, the greedy device selection technique (GDST) is advantageously capable of obtaining a satisfactory solution without requiring the evaluation of every single permutation possible in the tree hierarchy. By way of example, consider a farm that requires only ten devices: 6 computers, 3 storage devices, and a firewall device. The communication model of this exemplary farm requires that each computer can talk only to the internet and any available storage device but not to any other computer. Suppose this farm must be constructed from a tree hierarchy that has one central switch with ten other switches below that central switch, and each of the lower switches is connected to 10 devices. Each of these 100 devices can communicate with its immediate neighbors via a lower switch and any other device by taking an additional hop up to the central switch and back down.

In this simple example, it is estimated that there may be as many as 17 trillion ways to choose the ten devices of the farm from the aforementioned network that has 100 devices. Even with a fast computer, exploring all permutations to ascertain the absolute best solution may take an unacceptably long time and require unacceptably high computational power. The greedy device selection technique (GDST) is capable of obtaining a satisfactory solution while taking far less time. In the worst case, the selection of all required devices for the above-discussed exemplary farm requires 3.6 million steps, which is well within acceptable time and computation constraints given today's technologies.

Figure 3B:
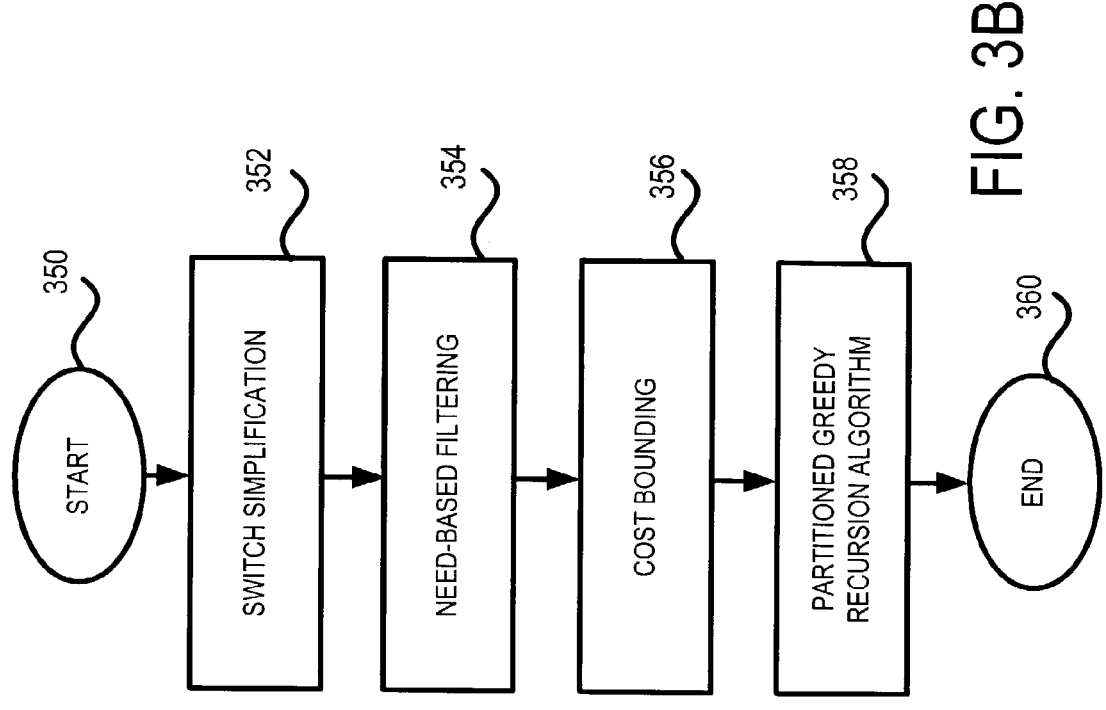
FIG. 3B illustrates the main steps of a greedy device selection technique (GDST), in accordance with another embodiment of the present invention.
Figure 3A:
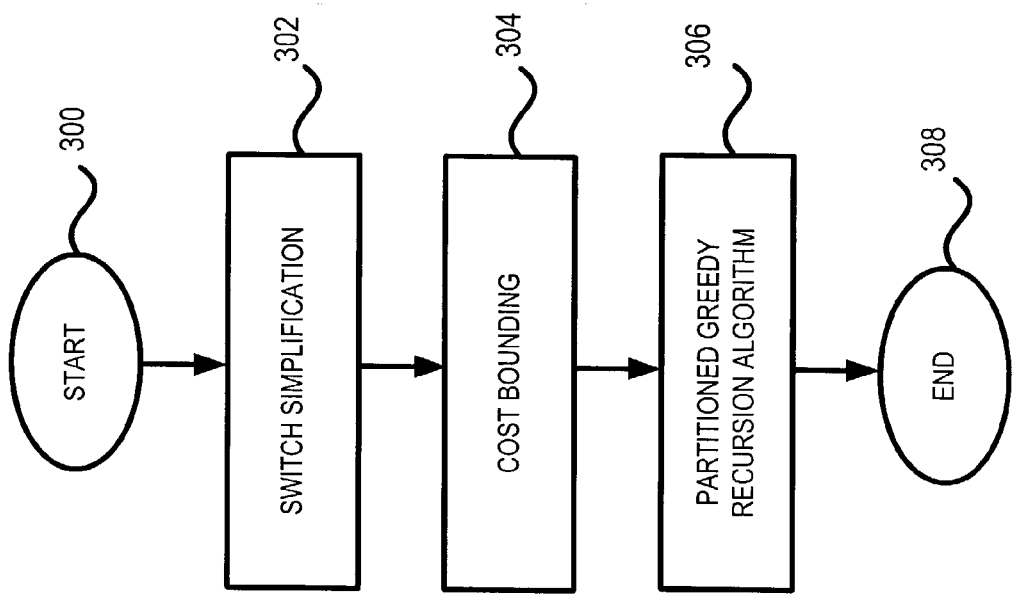
FIG. 3A illustrates the main steps of a greedy device selection technique (GDST), in accordance with one embodiment of the present invention.

In one embodiment of the present invention, the greedy device selection technique (GDST) includes three main steps: 1) switch simplification, 2) cost bounding, and 3) partitioned greedy recursion algorithm (PGRA). These steps are shown in respective blocks 302, 304, and 306 of FIG. 3A. In another embodiment of the present invention, the greedy device selection technique (GDST) includes four main steps: 1) switch simplification, 2) need-based filtering, 3) cost bounding, and 4) partitioned greedy recursion algorithm (PGRA). These steps are shown in respective blocks 352, 354, 356, and 358 of FIG. 3B.

Switch simplification involves simplifying the problem from solving for the exact devices required to ascertaining the number of each device type selected from each switch at the lowest (rack) level. This assumption reduces the selection problem from one that requires solving for a potentially large number of devices to one that requires solving for a smaller number of switches.

Need-based filtering, which is a further refinement to the greedy device selection technique (GDST), can help greatly reduce the number of candidate switches. Need-based filtering is discussed in a co-pending, commonly assigned application entitled "Need-based Filtering for Rapid Selection of Devices in a Tree Topology Network," filed on even date herewith and incorporated by reference herein.

Cost bounding refers to bounding the problem by establishing an initial upper bound cost (in terms of bandwidth utilization) using an initial solution. The initial solution, which includes all required devices as specified in the logical specification, may be picked in any manner. For example, the initial solution may be randomly picked, or picked using the first-come-first-served methodology discussed earlier. This initial solution establishes an initial upper bound cost. As the GDST traverses the tree hierarchy and evaluates possible solutions, any solution subsequently proposed must be at least as efficient as the initial upper bound cost in order to be considered a viable candidate solution.

In one embodiment, if a proposed solution turns out to have a lower cost than the initial upper bound cost, the cost associated with that proposed solution becomes the current upper bound cost and any subsequently proposed solution must be at least as efficient as the current upper bound cost in order to be considered a viable candidate solution. In a further embodiment, if the GDST evaluates a partial solution and the cost associates with the partial solution exceeds the current upper bound cost, the GDST can eliminate the partial solution from consideration without completing it. In this manner, substantial savings in computational time and memory can be realized since the GDST does not have to evaluate every potential solution to completion.

With respect to the partitioned greedy recursion algorithm (PGRA), the greedy device selection technique (GDST) starts at the top of the tree hierarchy and apply the partitioned greedy recursion algorithm (PGRA) recursively to find a good fit at each level of the tree. Once the entire tree is traversed, the solution that emerges is deemed the chosen solution.

FIG. 3C illustrates, in accordance with one embodiment of the present invention, a partitioned greedy recursion algorithm (PGRA). Starting at the top node of the tree, for a given node, list all children that still have devices that the farm needs (reference number 372). A loop is established wherein for each child of the parent that is not already in the solution set (reference number 374), performing the following steps. Take as much of each resource as possible until the demand is met (reference number 376), hence the greedy designation. If there are multiple groups of the same device type, take the one with the lowest communication cost first (reference number 378). The cost for this choice (permutation) is then determined (reference number 380). The child node is solved recursively (reference number 382). If the communication cost associated with the permutation found is lower than the current upper bound cost, insert the permutation into the sorted list (reference number 384).

If there are no children left, return failure (reference number 386). The best solution to date is then obtained (reference number 388). If there is no demand left, the solution is returned (reference number 390). The loop then continues with the next child (reference number 392).

The features and advantages of the present invention may be better understood with reference to the figures and discussions that follow. FIGS. 4-9 show, in accordance with one embodiment of the present invention, detailed steps of the inventive partitioned greedy recursion algorithm (PGRA). The operation of FIGS. 4-9 may be best understood with reference to an example. Suppose one wishes to build a farm having the logical specification of FIG. 2 (i.e., a firewall connected to 5 LP2000R application servers, which are connected to two A500 database servers) out of the tree hierarchy of FIG. 1. Appendix A herein will walk through the example with reference to the steps discussed in the FIGS. 4-9.

Figure 4:
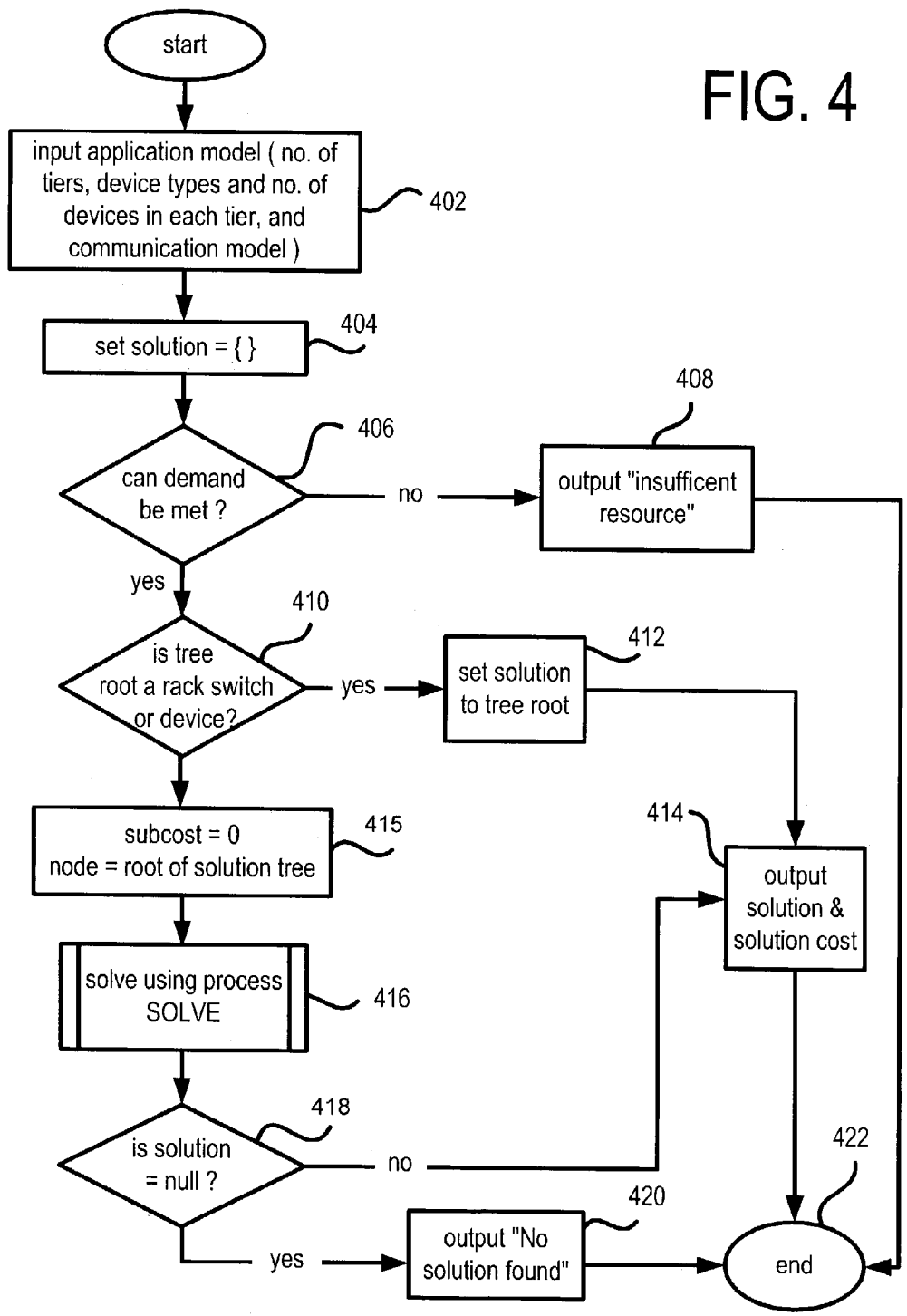
FIG. 4 shows the high level flowchart of one embodiment of the inventive partitioned greedy recursion algorithm.

FIG. 4 shows, in one embodiment, the high level flowchart of the inventive PGRA. In block 402, the logical specification and the communication models are inputted. The logical specification would specify the number of tiers (3 in this example), the device types, and the number and types of devices in each tier. The communication model may also specify the amount of traffic that is transmitted from and received at each device or each type of device.

In step 404, the initial solution set is null. In step 406, an initial determination is made to ascertain if the tree hierarchy has enough resource to meet the farm needs. This step ensures that as a whole, there is enough resource in the tree hierarchy so that the farm can be created. At this point, efficiency is not yet a concern, and step 406 merely checks for sufficiency of resources. If there is insufficient resource, the appropriate warning is generated (step 408) and the PGRA method ends.

Figure 1:
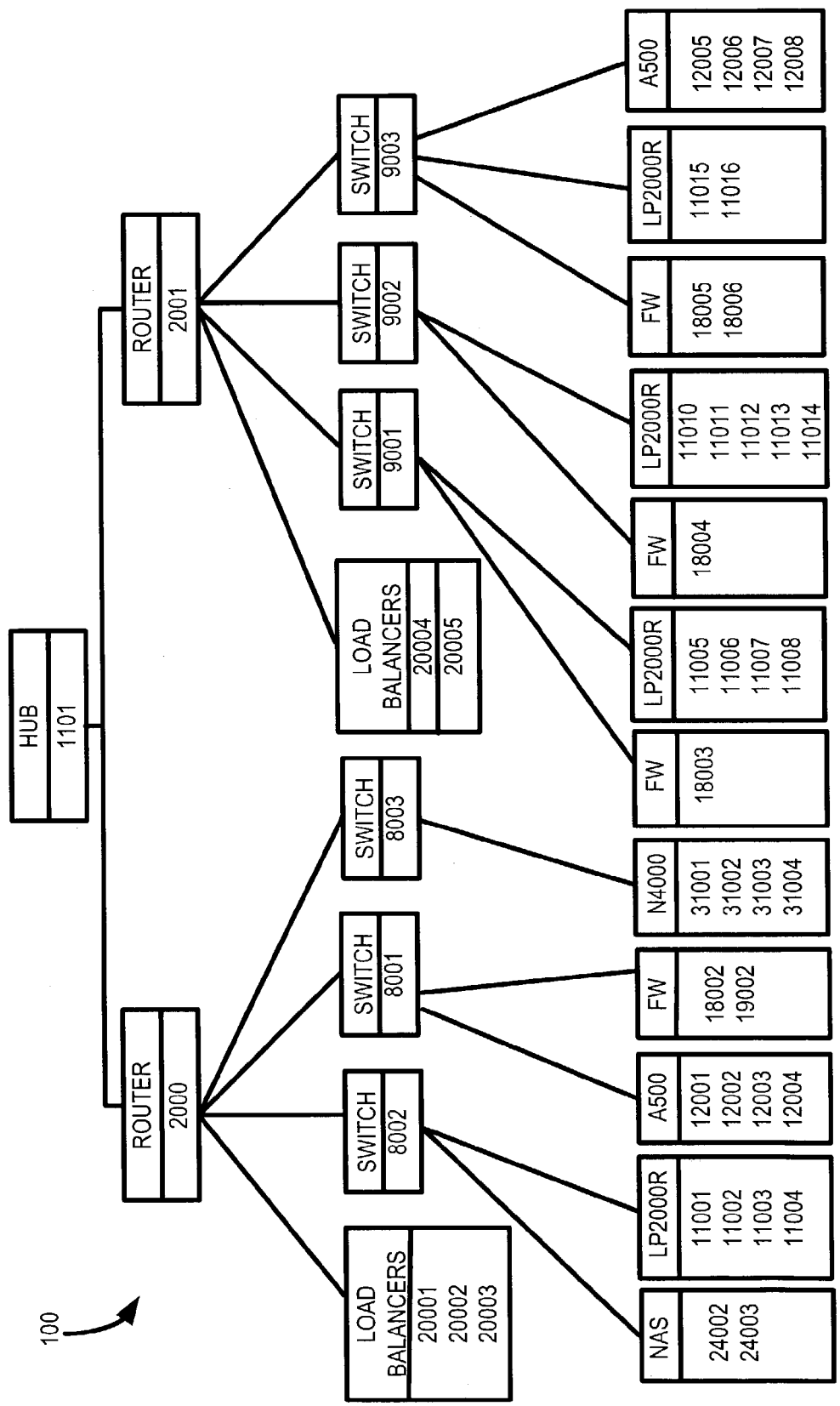
FIG. 1 illustrates an exemplary data center, representing the common pool of networked devices and switching elements from which various farms can be constructed.

On the other hand, if there is enough resource in the tree hierarchy, the method proceeds to step 410 wherein the simple test of having the root node being a rack switch or a device is made. If the root node is a rack switch or a simple device, the most efficient solution is already found since one device can communicate with other devices in the farm by going through that switch. With reference to FIG. 1, if the entire tree hierarchy had included only switch 9002 (which becomes the root node) and the devices underneath, there is no need to solve for the most efficient solution since the solution that has the root node/switch is already the most efficient (keep in mind that step 406 already indicates that there is sufficient resource in the tree hierarchy to satisfy the resource requirements). Of course, if the root node is a device (and step 406 already indicates that there is sufficient resource in the tree hierarchy to satisfy the resource requirement), the simple solution is found. In either case, the method proceeds to step 412 to set solution to the tree root and outputs the solution & solution cost (step 414).

On the other hand, if the tree root is neither a rack switch nor a device, the method proceeds to step 415 where the initial value of SUBCOST is set to 0 and the variable NODE is set to the root of the solution tree. In step 416, process SOLVE is called upon to provide the most efficient solution that the PGRA can find. Process SOLVE is explored further in FIG. 5 and subsequent figures herein. The solution outputted by process SOLVE is tested at block 418 to ascertain whether the solution outputted is a null solution.

If the solution outputted by process SOLVE is null, the method proceeds to block 420 where an appropriate message is generated and/or displayed. In the implementation where an upper bound is employed, the solution outputted by SOLVE may be null because it finds no solution more efficient than the initial solution. In this case, the message outputted by block 420 may reflect the fact that the initial solution happens to be the winning solution. On the other hand, if the solution set outputted by process SOLVE is not a null set (as determined in block 418), then the solution set is outputted, along with its cost, in block 414.

Figure 5:
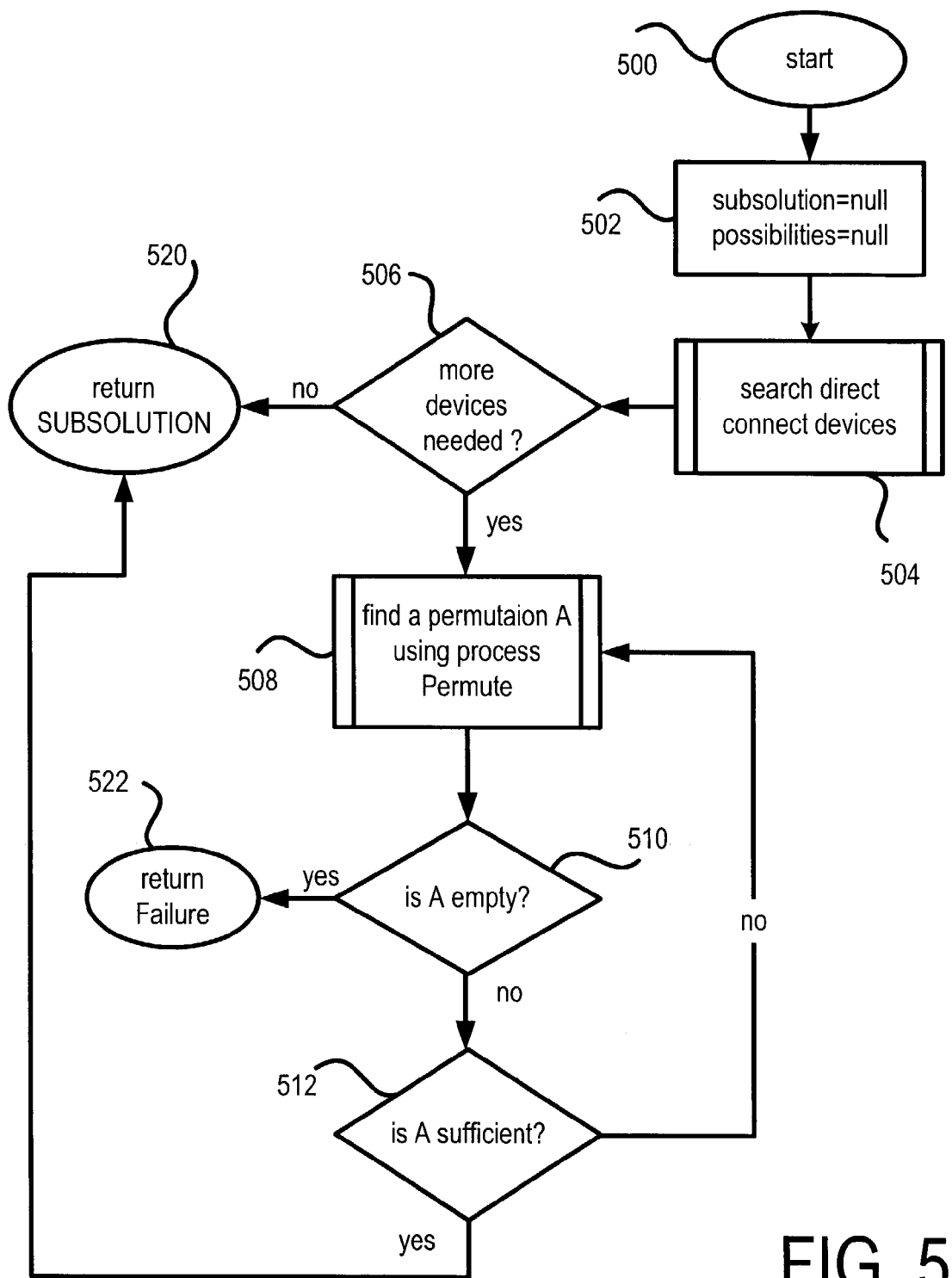
FIG. 5 illustrates, in accordance with one embodiment of the invention, the main steps associated with process SOLVE in FIG. 4 and FIG. 7.

FIG. 5 illustrates, in accordance with one embodiment of the invention, the steps associated with process SOLVE. Recall that in block 416 of FIG. 4, process SOLVE is called and initially the entire tree is passed into process SOLVE. In step 502, both SUBSOLUTION and POSSIBILITIES are set to null. In step 504, the direct connect devices are searched. As the term is employed herein, a direct connect device is a device that is directly coupled to the node under consideration. With reference to FIG. 1, if the node under consideration is router 2000, the direct connect devices would be the three load balancers 20001, 20002, and 20003. All other devices under router 2000 are coupled to router 2000 via one of the three switches 8001, 8002, and 8003 and are thus not classified as direct connect devices. Likewise, if the node under consideration is router 2001 the direct connect devices would be the two load balancers 20004 and 20005. All other devices under router 2001 are coupled to router 2001 via one of the three switches 9001, 9002, and 9003 and are thus not classified as direct connect devices. One implementation of block 504 (searching for direct connect devices) is discussed in greater detail with reference to FIG. 6 herein.

Figure 6:
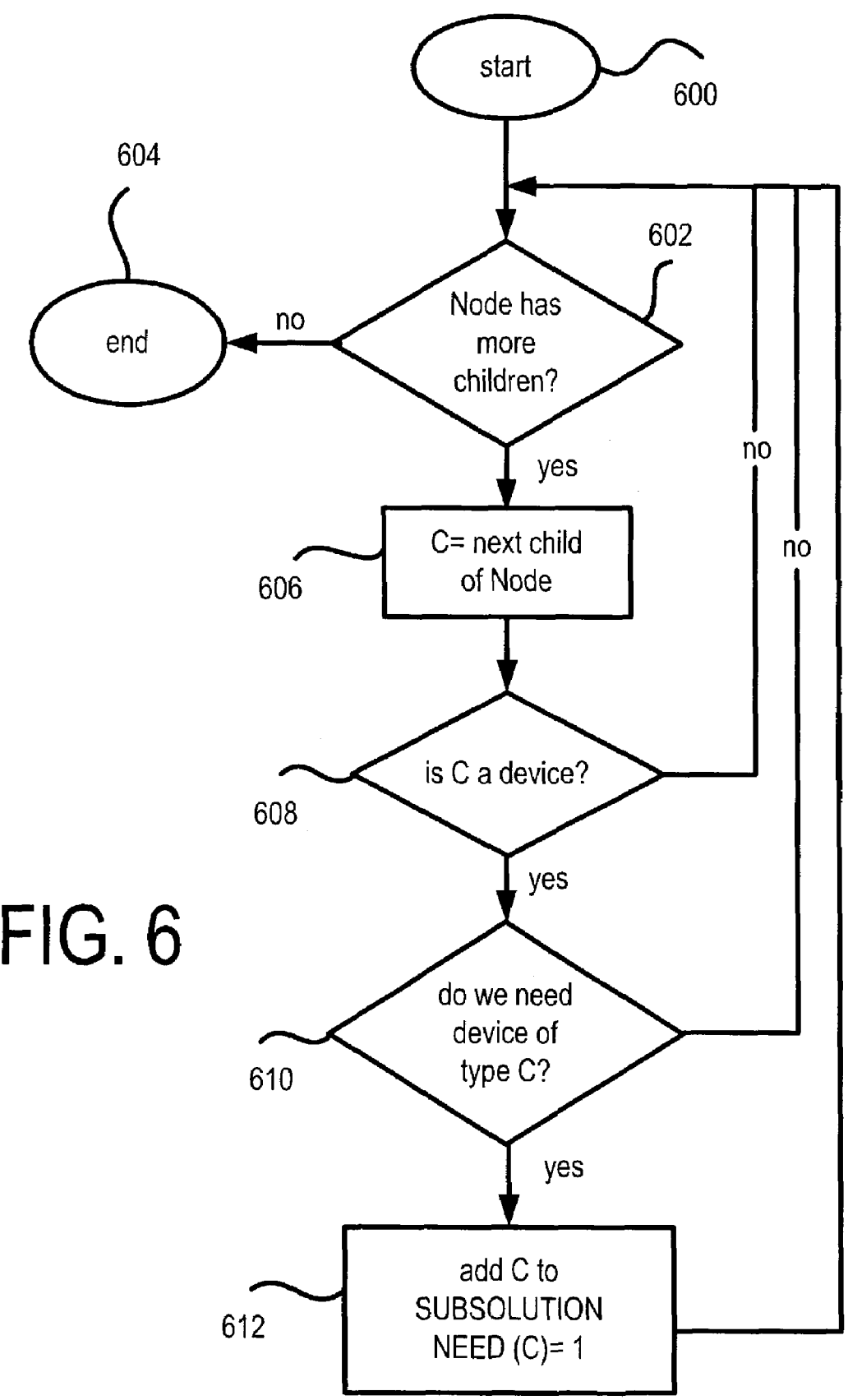
FIG. 6 illustrates the main steps for searching direct connect devices in accordance with one embodiment of the present invention.

In FIG. 6, the node is examined in block 602 to ascertain whether it has any more children. If not, the process of searching for direct connect devices ends (block 604). On the other hand, if the node has more children, a temporary variable C is employed (block 606) to step through the children of the node. In block 608, the child of the node is examined to determine whether it is a device (e.g., not a hub, switch, or router). If the child of the node is not a device (e.g., the child of the node is a hub, switch, or router), the method returns to block 602 to examine the next child of the node, if any.

On the other hand, if the child of the node is a device, the method proceeds to block 610 to ascertain whether the device is one that is needed by the farm. If the device is not one that is needed to build the farm, the method also returns to block 602 to examine the next child of the node, if any.

If the device turns out to be one that is needed to build the farm, the method proceeds to step 612 to add the device (which is the child of the node) into SUBSOLUTION and decrement the need for this type of device within the farm by 1. Thereafter, the method returns to block 602 to examine the next child of the node, if any. If all children of the node are examined, the method proceeds from block 602 to block 604, thereby ending the process for searching for direct connect devices.

Returning to FIG. 5, block 506 ascertains if more devices are needed. If no more devices are needed (e.g., in the case where the children of the node, which are the direct connect devices of the node, fulfilled all the device needs of the farm), the method proceeds to block 520 to return SUBSOLUTION. If more devices are needed (i.e., the children of the node, which are the direct connect devices of the node, did not fulfill all the device needs of the farm), the method proceeds to block 508 to find a permutation using process PERMUTE. Generally speaking, at a high level, process PERMUTE searches for all devices under a particular node in the tree, and given the current subsolution, recursively finds the best child switch to be appended to the solution. If the root of the tree is passed into process PERMUTE, the solution returned by process PERMUTE represents the best solution that process PERMUTE can find from the entire tree hierarchy. If an intermediate node (e.g., a switch, hub, or router) of the tree hierarchy is passed into process PERMUTE, the process PERMUTE recursively returns the best child switch that can be appended to the current subsolution under that particular node. Process PERMUTE will be discussed in greater detail later in connection with FIG. 7 herein.

With reference to FIG. 5, if the permutation found by process PEMMUTE is empty (block 510), the process proceeds to block 522 to return failure. On the other hand, if the permutation found by process PERMUTE in block 508 is not empty, the method proceeds to block 512 to test whether that permutation is sufficient, i.e., whether the permutation contains all the resources still needed in the subsolution. If not, the method returns to block 508 to keep permuting to come up with another permutation. On the other hand, if the permutation found by process PERMUTE in block 508 is sufficient, the method returns the updated solution.

Figure 7A:
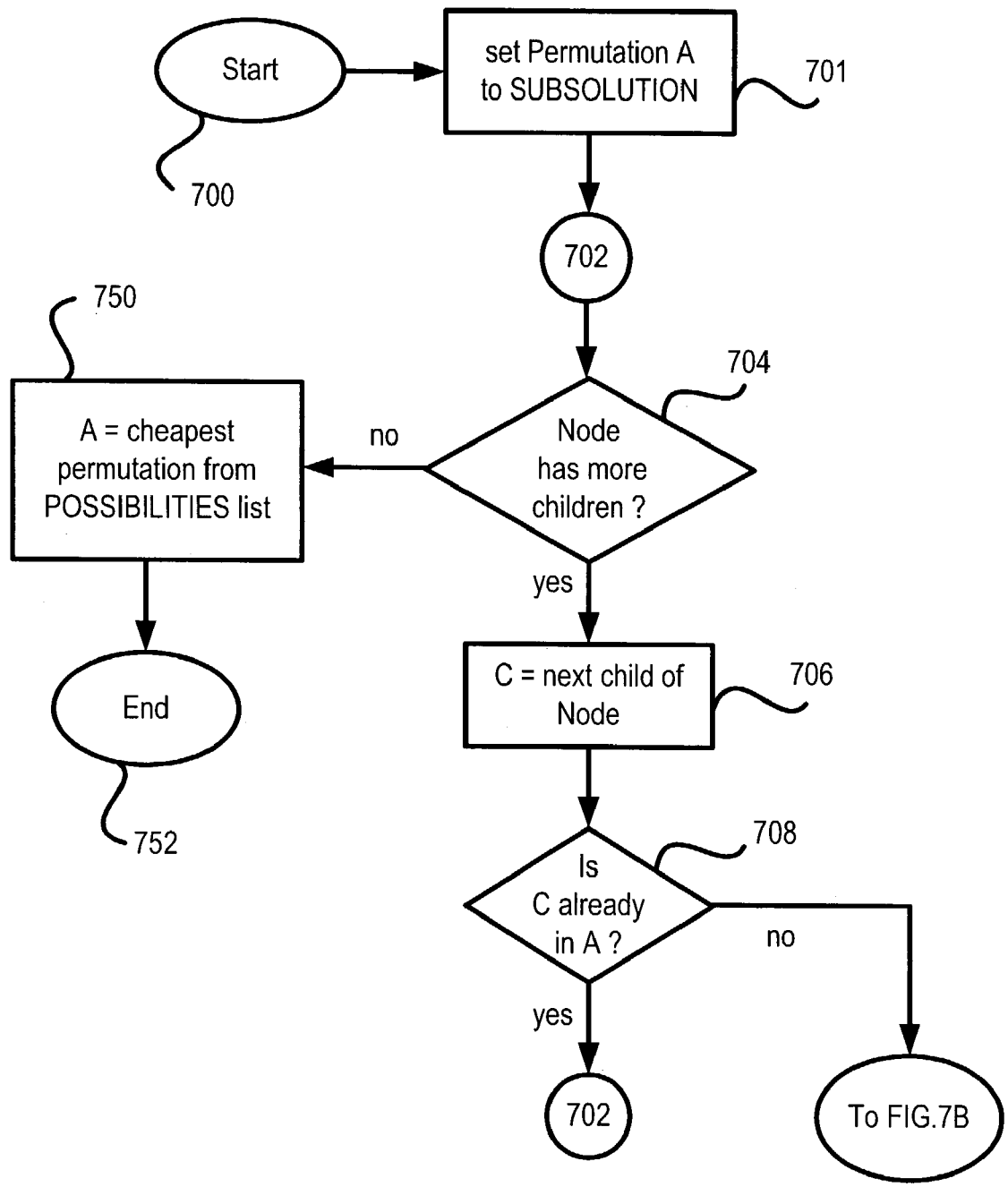
FIGS. 7A and 7B show, in accordance with one embodiment of the present invention, the main steps of PERMUTE process in FIG. 5.
Figure 7B:
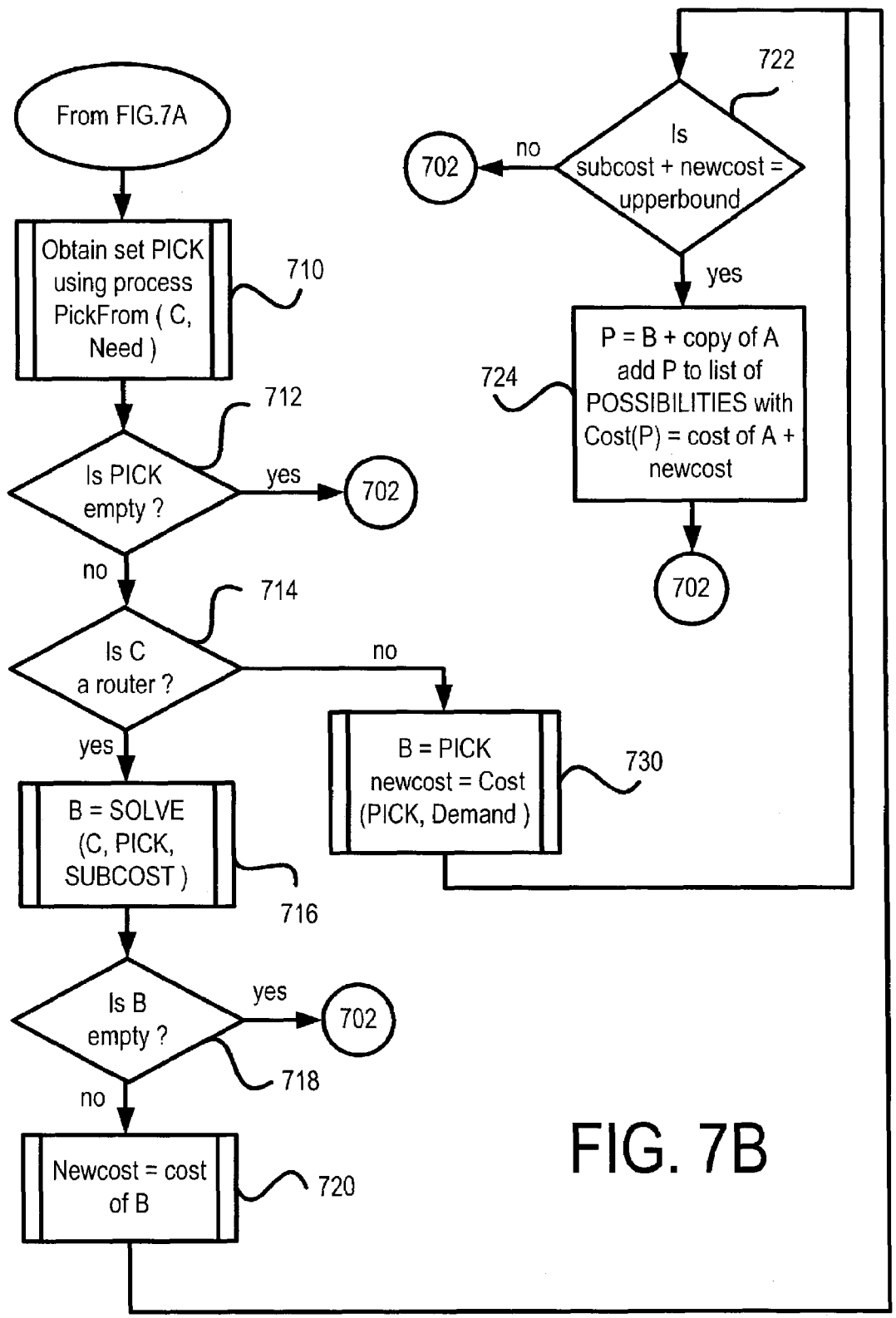

FIG. 7 shows, in accordance with one embodiment of the present invention, the permute process of block 508 in FIG. 5. In block 701, permutation A is set to SUBSOLUTION. If this is the first permutation, permutation A is null in block 701 due to the initial value setting (block 502 in FIG. 5) and there are no direct connect devices under hub 1101 (block 504 in FIG. 5). In block 704, it is ascertained whether the current node has any more children. If not, the method proceeds to block 750 wherein A is set to be the cheapest solution from POSSIBILITIES list. Thereafter the process ends in block 752.

With the first permutation, however, the answer is yes for the current example since the node equals to hub 1101. Therefore the method proceeds to block 706 where the temporary variable C is set to the next child of the node. In block 708, if the child of the node represented by the temporary variable C is already in the solution being tried, it is ignored and method returns to block 702 (represented by a circle prior to block 704). On the other hand, if the child node is not already in the solution being tried, the method proceeds to process PICK in block 710, wherein the child of the node represented by the temporary variable C will try to satisfy the farm needs greedily, i.e., as much as possible, using the resources under it. Process PICK will be discussed in details with reference to FIG. 8 herein.

In block 712, it is ascertained whether the result of process PICK is empty. If it is empty, then the method returns to block 702 to ascertain in block 704 whether the current node has any more children. On the other hand, if the result returned by process PICK is not empty, the method proceeds to block 714 wherein it is ascertained whether the child of the node (the child is currently represented by the temporary variable C) is a router. If it is a router, the method proceeds to block 716 to recursively call process SOLVE.

The result for SOLVE process call is tested in block 718. If the result is empty, the method returns to block 702. On the other hand, if the result of the recursive call to process SOLVE is not empty, the method proceeds to block 720 wherein the cost of B is computed. In block 722, it is ascertained whether the sum of the current value of subcost and the newcost of B (which is computed from block 720) is less than the current upper bound value. If it is not less than the current upper bound value, there is no need to proceed further with this child and the method returns to block 702. On the other hand, if the sum of the current value of subcost and the newcost of B is less than the current upper bound value, the partial solution is added to the list of possibilities, along with their costs (block 724).

On the other hand, if it is ascertained in block 714 that the child of the node (the child is currently represented by the variable C) is not a router, the method proceeds to block 730 wherein B is set to be equal to the result of process PICK and the new cost is computed.

Figure 2:
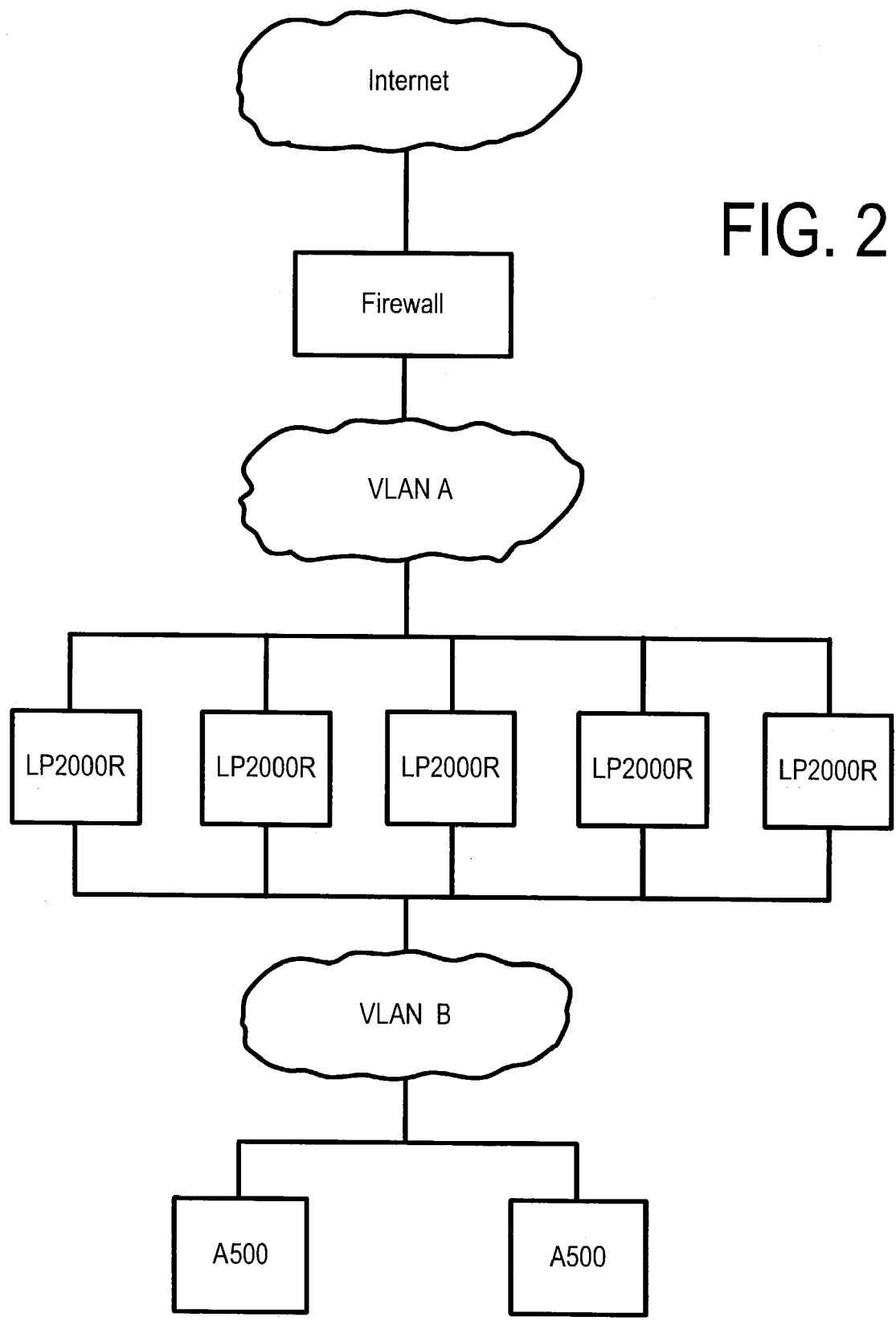
FIG. 2 illustrates the logical specification of an exemplary farm.

Thus, going through the present example of FIGS. 1 and 2, router 2000 will be able to greedily provide 1 firewall, 4 LP2000R application servers, and 2 A500 servers. One of the LP2000R application servers is still missing. Router 2001 will be able to greedily provide all required devices (i.e., firewall, 5 LP2000R application servers, and 2 A500 servers). The costs for these solutions are also computed and added to the possibilities list in bock 724. Since there are no other children for hub 1101, A will be set to the cheapest permutation from the possibilities list (block 750), which turns out to be router 2001. Thereafter, the PERMUTE process ends and the method returns to FIG. 5 wherein the solution represented by A will be checked to see whether it is empty (block 510). The remainder of FIG. 5 has already been discussed and will not be repeated here.

Figure 8:
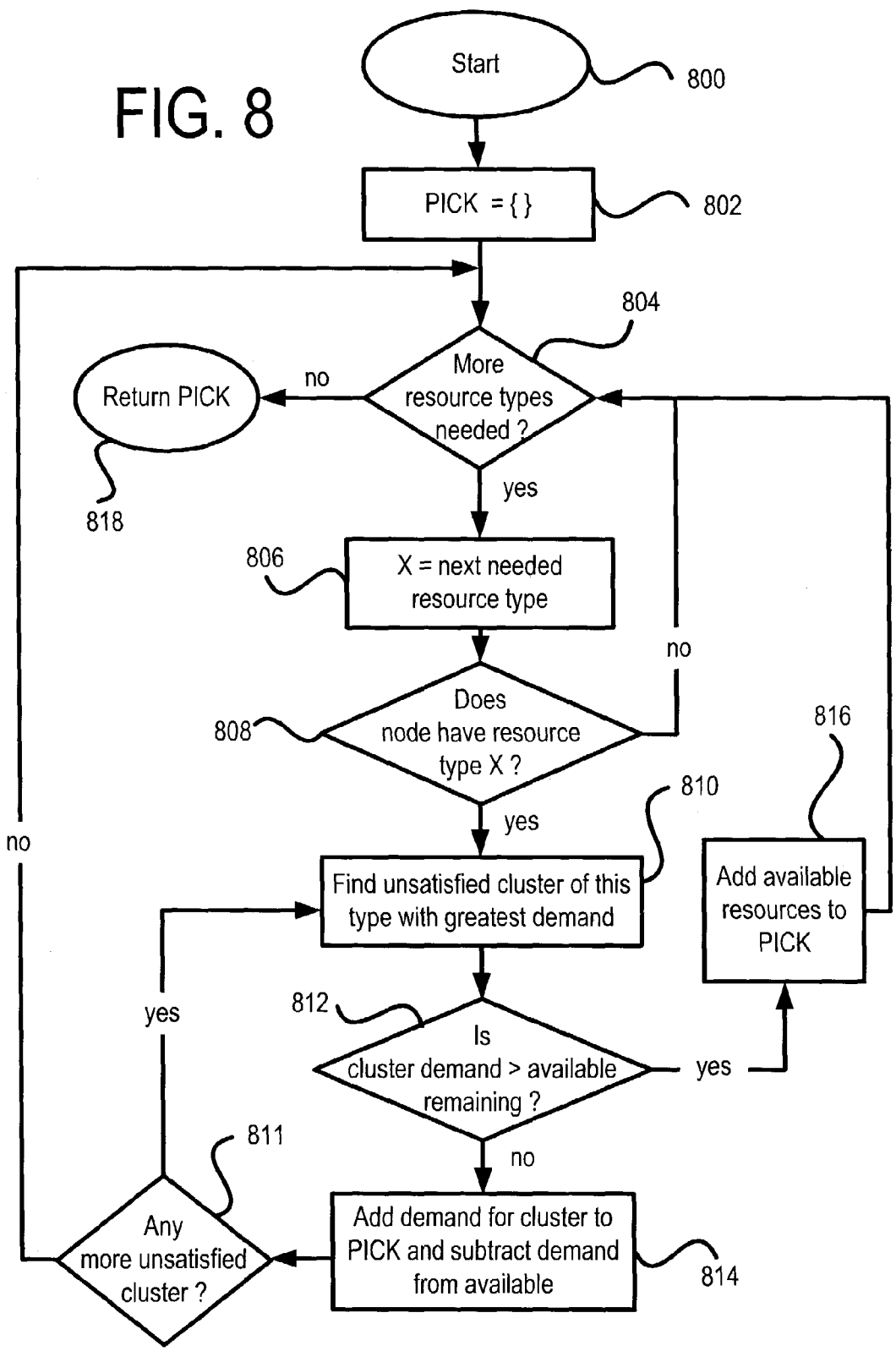
FIG. 8 shows, in accordance with one embodiment of the present invention, the main steps of process PICK in FIG. 7.

FIG. 8 shows, in accordance with one embodiment of the present invention, process PICK of block 710 of FIG. 7. In process PICK, the goal is to greedily satisfy the farm needs using as large a cluster of a given device type as possible to minimize traffic into and out of the device cluster. A group of devices having the same type and communication pattern is referred to herein as a "cluster." For example, in FIG. 2, the farm is composed of three clusters containing the firewall, the LP2000Rs, and the A500s respectively. Clusters of devices usually talk to other clusters but devices within a cluster generally do not communicate among themselves. Thus, the effect is to localize the problem by assuming the best solution would draw all resources from a single node, or if that is not possible, draw resources from the fewest possible nodes. In this manner, it is unnecessary to exhaustively try out all permutations and compare them against another.

In block 802, the result of PICK is set to null initially. Then the process goes through each resource type (e.g., A500 servers, LP2000R servers, firewalls, etc.) and attempts to satisfy all requirements related to a particular resource type as greedily as possible using the resources available under the node. In block 804, it is ascertained from the farm demands whether more resource types are needed. If more resources types are needed, the method proceeds to block 806 wherein the temporary variable X is set to the next needed resource type. In block 808, it is ascertained if the node has anywhere under it a given resource type X that is needed by the farm. If not, the method returns to block 804 wherein another resource type is tested.

On the other hand, if it is ascertained in block 808 that the node does have the needed resource type X, the method proceeds to block 810 wherein the unsatisfied cluster of resource type X with greatest demand is found. This heuristic approximates a best fit by satisfying the largest part of the unsatisfied demand first.

In block 812 it is ascertained whether the cluster demand is greater than the available remaining.

If not, the demand for cluster is added to PICK and subtracted from available (block 814). The process then goes back to block 810 wherein the remaining unsatisfied clusters of type X with the greatest demand is found.

On the hand, if it is ascertained in block 812 that the cluster demand is not greater than the available remaining, the method proceeds to block 816 wherein the available resources are added to PICK. Thereafter, the method returns to block 804.

Figure 9:
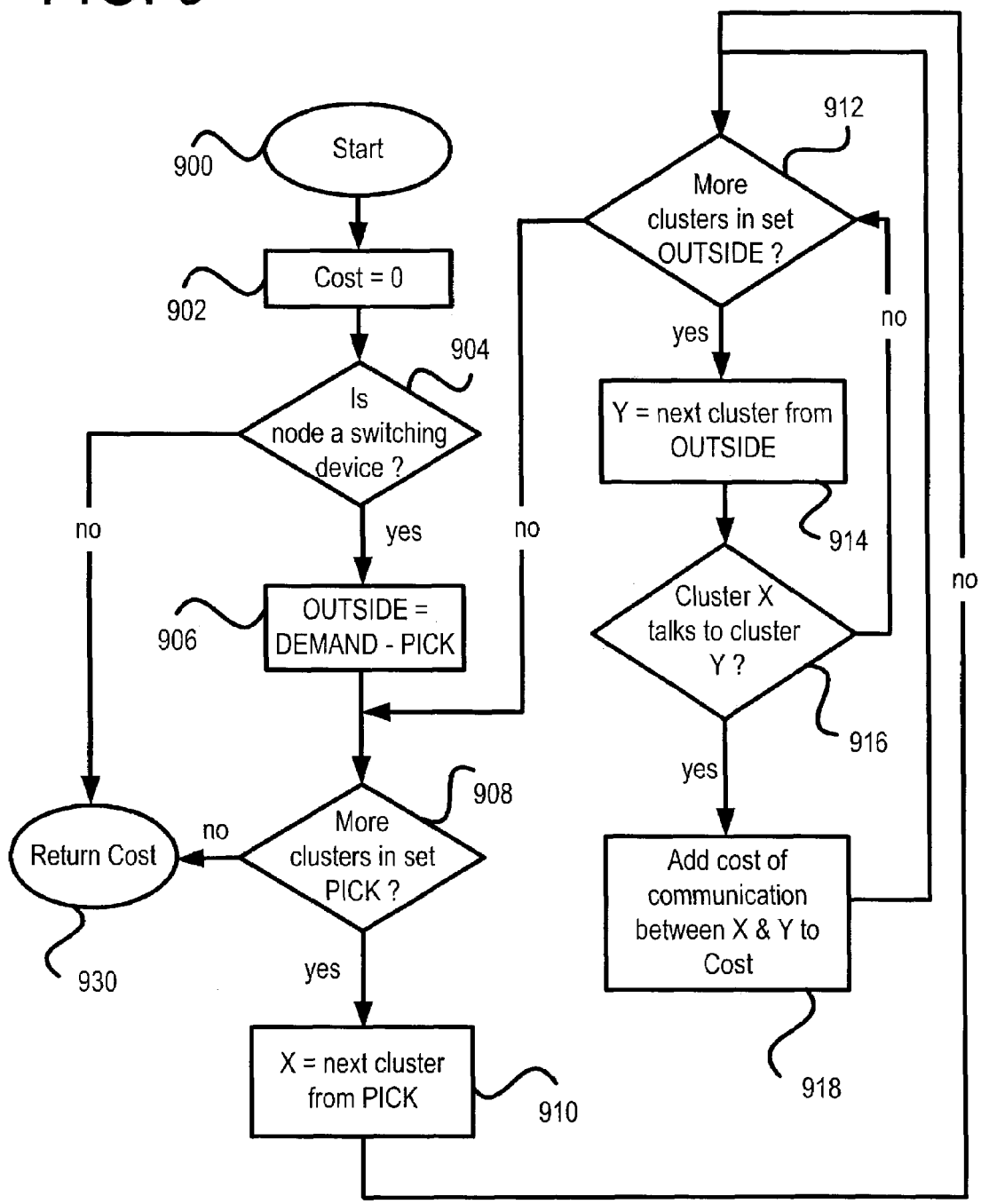
FIG. 9 shows, in accordance with one embodiment of the present invention, the main steps of process COST in FIG. 7.

FIG. 9 shows, in accordance with one embodiment of the present invention, the process COST of, for example, block 720 or block 730 of FIG. 7. Generally speaking, at a high level, process COST determines the communication cost for a particular node by determining the communication cost between the picked devices below that node and the remaining required devices outside of the node (i.e., the outside cost). Process COST works cooperatively with process PERMUTE of FIG. 7 such that the outside cost is then added to the communication cost internal to the picked devices below that node to arrive at the total communication cost with respect to a particular node (see FIG. 7, blocks 720, 722, and 724). Thus, the cost calculation is localized, hierarchical and also cumulative in the sense that whatever cost computed for the devices below a particular node is added to the cost computed for the current node for the current permutation. Furthermore, at each level, only the lowest cost solution is passed up.

In block 902, the local variable Cost is initialized to 0. In block 904, it is ascertained whether the current node is a switching device (e.g., a switch, hub, or router). If not, there is no communication through the node from the picked devices below to the outside devices (defined as the farm demand less the set of picked devices for the current permutation). In that case, the process returns to its calling process at block 930.

On the other hand, if the current node is a switching device, the clusters in the set of picked devices below the current node are processed one by one. Thus, in block 906, the set OUTSIDE is ascertained. Devices are deemed to be in the OUTSIDE set if they are required per the farm demand but are not fulfilled by the picked devices below the current node. In block 908, it is ascertained if there are any clusters not yet processed. If not, the process returns to its calling process at block 930.

If there are additional clusters not yet processed, the method proceeds to block 910 wherein the variable X is employed to represent the next unprocessed cluster in the current set of picked devices. In block 912, it is ascertained whether there are more clusters in the set OUTSIDE. If there are none, the method proceeds from block 902 to block 908 to process the next cluster in the set of picked devices under the current node.

If there are more clusters in the set OUTSIDE (as ascertained by block 912), the method proceeds to block 914 wherein the variable Y is employed to represent the next cluster from the OUTSIDE set. In block 916, it is ascertained whether cluster X, which is ascertained in block 910, communicates with cluster Y, which is ascertained in block 914. If these two clusters do not communicate, the method returns to block 912 to process the next cluster from the OUTSIDE set.

On the other hand, if the internal cluster X communicates with the OUTSIDE cluster Y (as ascertained by block 916), the method proceeds from block 916 to block 918 wherein the cost of communication between cluster X and cluster Y is added to the communication cost. Note that at this point, the process advantageously does not require the exact location of the OUTSIDE cluster relative to the cluster below the current node. As long as the OUTSIDE cluster is external of the current node and needs to traverse the current node to communicate with the internal cluster, the cost can be computed. This feature advantageously saves computational cost in this hierarchical and recursive technique. After block 918, the method returns to block 912 to process the next cluster from the OUTSIDE set.

The operation of the flowcharts of FIGS. 3A, 3B, 3C, 4, 5, 6, 7, 8, and 9 may be better appreciated with reference to a practical example. Appendix A herein illustrates how the farm specified in exemplary FIG. 2 may be created from the hierarchical tree structure of FIG. 1 using the techniques discussed in the figures herein. The reader is invited to trace the steps of the example in Appendix A using the figures herein as reference. For brevity's sake, such step-by-step tracing of the example is not belabored herein.

As can be appreciated from the foregoing, the invention substantially reduces the amount of computation and time required to come up with an efficient set of picked devices to build a farm from a tree hierarchy. By bounding the solution initially with an initial upper bound cost and rejecting any solution whose cost exceeds that initial upper bound cost, half of all possible permutations are statistically eliminated. Additionally, either in the same embodiment or in a different embodiment, the upper bound is continually revised as more efficient candidate solutions are found. Additionally, either in the same embodiment or in a different embodiment, a partial solution having a greater cost than the current upper bound cost is discarded without requiring the completion of that solution. Note that when cost calculation is made, it is made locally at a node taking advantage of any internal cost already computed for the devices below it and also without regard to the exact location of the remaining devices outside of the node.

Further, the simplification of the problem to switches (i.e., switch simplification as mentioned above) substantially simplifies the number of sub-problems to be solved. Also, the use of a recursive approach where a node is recursively solved by going deeper into the tree and either accepts the proposed solution with respect to that node as the current best candidate or rejects the proposed solution allows the method to efficiently walk through the tree hierarchy.

APPENDIX EXAMPLE

First-Come-First-Served (FCFS)

With reference to FIG. 2, the first-come-first-served cost is about 1,440 Mbps hops. The cost is calculated based on the traffic capability of the firewall (100 Mbps), each application server LP2000R (100 Mbps each) and each database server A500 (100 Mbps each).

Going left to right in the tree hierarchy of FIG. 1, the devices are fulfilled as follows

TABLE A1

Devices selected using FCFS

| Device Type | Device ID | Number of ports | Traffic Load (Mbps) |
|---|---|---|---|
| Application Server LP2000R | 11001 | 1 | 100 |
| Application Server LP2000R | 11002 | 1 | 100 |
| Application Server LP2000R | 11003 | 1 | 100 |
| Application Server LP2000R | 11004 | 1 | 100 |
| Database Server A500 | 12001 | 1 | 100 |
| Database Server A500 | 12002 | 1 | 100 |
| Firewall Cisco | 18002 | 2 | 100 |
| Application Server LP2000R | 11005 | 1 | 100 |

The total traffic load is 2640 Mbps hops and is computed as follows.

Step 1: Firewall to LP2000R servers:
4 hops (⅘) * 100 Mbps+6 hops (⅕) * 100 Mbps=440 Mbps hops Step 2: A500 servers to LP2000R servers:
4 hops (⅘) * 200 Mbps+6 hops (⅕) * 200 Mbps=880 Mbps hops Although the LP2000R servers can produce up to 500 Mbps per subnet, the link maximum capacity is assumed to be the constraint. Thus, the amount of data out is assumed to be about the same as the amount of data in for each VLAN, and the total traffic load is 2 * (440 Mbps hops+880 Mbps hops) or 2640 Mbps hops.

However, the first and last hop of every message may be ignored since these are unavoidable and will show up in every solution. Furthermore, these cause no shared switch in network traffic. Thus, the revised cost is calculated as follows:

Revised step 1: Firewall to LP2000R servers:
2 hops (⅘) * 100 Mbps+4 hops (⅕) * 100 Mbps=240 Mbps hops Revised step 2: A500 servers to LP2000R servers:
2 hops (⅘) * 200 Mbps+4 hops (⅕) * 200 Mbps=480 Mbps hops The amount of data out is assumed to be about the same as the amount of data in for each VLAN, hence the total revised traffic load is 2* (240 Mbps hops+480 Mbps hops) or 1440 Mbps hops.

Partitioned Greedy Recursion Algorithm (PGRA)

Using the logical specification and communication model associated with FIG. 2, the PGRA constructs the farm as shown in Table A2 using the tree hierarchy of FIG. 1.

TABLE A2

Devices selected using PGRA.

| Device Type | Device ID | Number of ports | Traffic Load (Mbps) |
|---|---|---|---|
| Firewall Cisco | 18004 | 2 | 100 |
| Application Server LP2000R | 11010 | 1 | 100 |
| Application Server LP2000R | 11011 | 1 | 100 |
| Application Server LP2000R | 11012 | 1 | 100 |
| Application Server LP2000R | 11013 | 1 | 100 |
| Application Server LP2000R | 11014 | 1 | 100 |
| Database Server A500 | 12005 | 1 | 100 |
| Database Server A500 | 12006 | 1 | 100 |

The total traffic load is 800 Mbps hops and is computed as follows.

Step 1: Firewall to LP2000R servers:
No cost as they can communicate via switch 9002

Step 2: A500 servers to LP2000R servers:
2 hops * 200 Mbps=400 Mbps hops

Since the amount of data out is assumed to be about the same as the amount of data in for each VLAN, the total revised traffic load is 2* (400 Mbps hops) or 800 Mbps hops, which is much more efficient than achievable via FCFS.

The steps taken to arrive at the PGRA solution is as follows: Assume that the initial upper bound is 1440 Mbps hops given by FCFS.

There are no direct connect devices under hub 1101 in this example. Start at the hub 1101 and look at both router children. Each child is asked how much of the request they will take, and each replies greedily, as much as possible.

Router 2000 says it can handle, by resource:
  1 firewall
  4 LP2000R application servers (with one left over)
  2 A500 servers
  Solving for children,
    Switch 8002 says it will take the 4 LP2000R application servers
      No recursion
      Cost is  80 Mbps out to firewall,
              80 Mbps in from firewall,
              160 Mbps out to A500 servers,
              160 Mbps in from A500 servers = 480 Mbps
      SAVE
    Switch 8001 says it will take the firewall and 2 A500 servers
      No recursion
      Cost is  100 Mbps out to LP2000R application servers (firewall)
              100 Mbps in from LP2000R application servers (firewall)
              200 Mbps out to LP2000R application servers (A500 servers)
              200 Mbps in from LP2000R application servers (A500 servers)
              = 600 Mbps
      SAVE
    SEARCH
    Switch 8002 is the cheapest, so we chose it first
      then we look at what is left, and
      switch 8001 says it will take everything left.
    Total of all children chosen, 1080 Mbps
    Cost for router 2000 alone is
      20 Mbps from firewall to LP2000R application server,
      20 back in to LP2000R application server,
      40 from A500 servers,
      40 Mbps back in to A500 servers = 120 Mbps
  Total cost for subsolution is 1200 Mbps, still needs 1 LP2000R application server; SAVE
Router 2001 says it will take everything
  Solving for children,
    Switch 9001 says it will take firewall + 4 LP2000R application servers
      No recursion
      Cost is 20 Mbps in and 20 Mbps out to final LP2000R application server,
      and 160 Mbps in and 160 Mbps out to A500 servers = 360 Mbps
      SAVE
    Switch 9002 says it will take firewall + 5 LP2000R application servers
      No recursion
      Cost is 200 Mbps in and 200 Mbps out to A500 servers = 400 Mbps
      SAVE
    Switch 9003 says it will take firewall and 2 A500 servers
      Cost is 100 Mbps + 100 Mbps + 200 Mbps + 200 Mbps = 600 Mbps
      SAVE
    SEARCH
    Try switch 9001 first because it is the least costly so far
      For all children
        Skip switch 9001, already in solution -continued

```
        Extend by switch 9002, take 1 LP2000R application server
        Add cost 20 Mbps + 20 Mbps + 40 Mbps + 40 Mbps =
          120 Mbps
        Total cost = 360 Mbps base + 120 Mbps = 480 Mbps
        SAVE possibility (switch 9001, switch 9002)
        Extend by switch 9003, takes 2 A500 servers
          Added cost = 200 Mbps + 200 Mbps = 400 Mbps
          Total cost = 360 Mbps base + 400 Mbps = 760 Mbps
          SAVE possibility (switch 9001, switch 9002)
      SEARCH
      Try switch 9002 now because it has the next lowest cost at
        400 Mbps
        For all children
          Skip switch 9001, nothing to offer
          Skip switch 9002, already in solution
          Extend by switch 9003, takes 2 A500 servers
          Added cost = 200 Mbps + 200 Mbps = 400 Mbps
          Total cost = 400 Mbps base + 400 Mbps = 800 Mbps
          [note that solution is now complete]
          SAVE possibility (switch 9002, switch 9003)
      SEARCH
      Try possibility (switch 9001, switch 9002) at cost of 480 Mbps
        For all children
          Skip switch 9001, already in solution
          Skip switch 9002, already in solution
          Extend by switch 9003, takes 2 A500 servers
          Added cost = 200 Mbps + 200 Mbps = 400 Mbps
          Total cost = 480 Mbps base + 400 Mbps = 880 Mbps
          [note that solution is now complete]
          SAVE possibility (switch 9001, switch 9002, switch 9003)
      SEARCH
      Try possibility (switch 9002, switch 9003) at cost of 800 Mbps
      Return SOLUTION
  Compute added traffic for router 2001 = 0 Mbps because all traffic
  internal
  Total cost for solution = 800 Mbps
  Save router 2001 solution
  SEARCH
  Router 2001 has lowest cost
  Return SOLUTION
```

While this invention has been described in terms of several preferred embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for creating a network farm from a tree topology network, comprising:

receiving a logical specification of said farm, said logical specification specifying at least one of device types required by said farm and a number of devices for each of said device types;

receiving a communication model for said farm, said communication model specifying expected bandwidth usage for devices of said farm; and ascertaining, responsive to said logical specification and said communication model, a solution set of devices among devices of said tree topology network for constructing said farm, said ascertaining including performing partitioned greedy recursion on switching elements of said tree topology network, said partitioned greedy recursion includes recursively ascertaining, starting from the top level of said tree topology network and recursing toward the lowest switching element level of said tree topology network, the lowest cost solution at each switching element level of said tree topology network, wherein the lowest cost solution that completely satisfies resource requirements of said farm and that is found after said tree topology network is traversed by said partitioned greedy recursion is deemed said solution set of devices.

2. The method of claim 1 further comprising performing switch simplification on said tree topology network prior to said performing said partitioned greedy recursion.

3. The method of claim 2 wherein said switch simplification includes ascertaining a number of each device type from each rack switch, said each rack switch representing a switch at the lowest switching element level of said tree topology network.

4. The method of claim 1 further comprising setting an initial upper bound cost from an initial solution, said initial upper bound cost pertains to bandwidth utilization by devices in said initial solution when said devices in said initial solution are employed to construct said farm in accordance with said logical specification and said communication model, wherein any potential solution obtained during said recursively ascertaining is removed from further consideration if a communication cost associated with said potential solution exceeds said initial upper bound cost.

5. The method of claim 4 further including setting, during said recursively ascertaining, said initial upper bound cost to be equal to a communication cost associated with a potential solution under consideration if said communication cost associated with said potential solution under consideration is lower than said initial upper bound cost prior to said setting and if said potential solution completely satisfies resource requirements specified in said logical specification.

6. The method of claim 4 wherein said initial solution is one of a first-come-first-served solution and a random solution.

7. The method of claim 1 wherein said recursively ascertaining includes greedily satisfying, while recursing at a particular switching element of said tree topology network, as many of the resources required by said farm as possible using resources under said particular switching element.

8. The method of claim 7 wherein said resources under said particular switching element includes direct connect devices that are directly coupled to said particular switching element and resources under children switching elements of said particular switching element.

9. The method of claim 7 wherein said recursively ascertaining further includes selecting, if there are multiple groups of the same device type under said particular switching elements, a group having the lowest communication cost to greedily satisfy said resources required by said farm.

10. The method of claim 7 wherein potential solutions obtained while performing said partitioned greedy recursion are kept in a sorted list, a potential solution of said potential solutions that has the lowest communication cost relative to other potential solutions of said potential solutions in said sorted list is deemed said solution set of devices after said tree topology network is traversed.

11. A computer-implemented method for ascertaining, responsive to a logical specification of a network farm and a communication model for said farm, a solution set of devices among devices of a tree topology network for constructing said farm, said method comprising:

performing switch simplification on said tree topology network, said switch simplification includes ascertaining a number of each device type from each rack switch, said each rack switch representing a switch at the lowest switching element level of said tree topology network; and performing partitioned greedy recursion on switching elements of said tree topology network, said partitioned greedy recursion includes recursively ascertaining, starting from the top level of said tree topology network and recursing toward the lowest switching element level of said tree topology network, the lowest cost solution at each switching element level of said tree topology network, wherein said lowest cost solution that completely satisfies resource requirements of said farm and that is found after said tree topology network is traversed by said partitioned greedy recursion is deemed said solution set of devices.

12. The computer-implemented method of claim 11 further comprising ascertaining an initial upper bound cost from an initial solution, said initial upper bound cost pertains to a bandwidth utilization by devices in said initial solution when said devices in said initial solution is employed to construct said farm, wherein any potential solution obtained while performing said partitioned greedy recursion is removed from further consideration if a communication cost associated with said potential solution exceeds said initial upper bound cost.

13. The computer-implemented method of claim 12 further including setting, during said recursively ascertaining, said initial upper bound cost to be equal to a communication cost associated with a potential solution under consideration if said communication cost associated with said potential solution under consideration is lower than said initial upper bound cost prior to said setting.

14. The computer-implemented method of claim 12 wherein said recursively ascertaining includes greedily satisfying, while recursing at a particular switching element of said tree topology network, as many of the resources required by said farm as possible using resources under said particular switching element.

15. The computer-implemented method of claim 14 wherein said resources under said particular switching element includes direct connect devices and resources under children switching elements of said particular switching element.

16. The computer-implemented method of claim 14 wherein said recursively ascertaining further includes selecting, if there are multiple groups of the same device type under said particular switching elements, a group having the lowest communication cost to greedily satisfy said resources required by said farm.

17. The computer-implemented method of claim 14 wherein potential solutions obtained while performing said partitioned greedy recursion are kept in a sorted list, a potential solution of said potential solutions that has the lowest communication cost relative to other potential solutions of said potential solutions in said sorted list is deemed said solution set of devices after said tree topology network is traversed.

18. A computer readable medium encoded with a computer program for ascertaining, responsive to a logical specification of a network farm and a communication model for said farm, a solution set of devices among devices of a tree topology network for constructing said farm, said computer readable medium comprising:

computer readable codes for performing switch simplification on said tree topology network, said switch simplification includes ascertaining a number of each device type from each rack switch, said each rack switch representing a switch at the lowest switching element level of said tree topology network; and computer readable codes for performing partitioned greedy recursion, on switching elements of said tree topology network, said computer readable codes for partitioned greedy recursion includes computer readable codes for recursively ascertaining, starting from the top level of said tree topology network and recursing toward the lowest switching element level of said tree topology network, the lowest cost solution at each switching element level of said tree topology network, wherein said lowest cost solution that completely satisfies resource requirements of said farm and that is found after said tree topology network is traversed by said partitioned greedy recursion is deemed said solution set of devices.

19. The article of manufacture of claim 18 further comprising computer readable codes for ascertaining an initial upper bound cost from an initial solution, said initial upper bound cost pertains to bandwidth utilization by devices in said initial solution when said devices in said initial solution are employed to construct said farm in accordance with said logical specification and said communication model, wherein any potential solution obtained during said recursively ascertaining is removed from further consideration if a communication cost associated with said potential solution exceeds said initial upper bound cost.

20. The article of manufacture of claim 19 further including computer readable codes for setting, during said recursively ascertaining, said initial upper bound cost to be equal to a communication cost associated with a potential solution under consideration if said communication cost associated with said potential solution under consideration is lower than said initial upper bound cost prior to said setting and if said potential solution completely satisfies resource requirements specified in said logical specification.

21. The article of manufacture of claim 19 wherein said initial solution is one of a first-come-first-served solution and a random solution.

22. The article of manufacture of claim 18 wherein said computer readable codes for recursively ascertaining includes computer readable codes for greedily satisfying, while recursing at a particular switching element of said tree topology network, as many of the resources required by said farm as possible using resources under said particular switching element.

23. The article of manufacture of claim 22 wherein said resources under said particular switching element includes direct connect devices that are directly coupled to said particular switching element and resources under children switching elements of said particular switching element.

24. The article of manufacture of claim 22 wherein said computer readable codes for recursively ascertaining further includes computer readable codes for selecting, if there are multiple groups of the same device type under said particular switching elements, a group having the lowest communication cost to greedily satisfy said resources required by said farm.

25. The article of manufacture of claim 22 further comprising computer readable codes for storing potential solutions obtained while performing said partitioned greedy recursion in a sorted data structure, a potential solution of said potential solutions that has the lowest communication cost relative to other potential solutions of said potential solutions in said sorted data structure is deemed said solution set of devices after said tree topology network is traversed.

* * * * *